(12) United States Patent
Saha et al.

(10) Patent No.: US 9,733,937 B2
(45) Date of Patent: Aug. 15, 2017

(54) COMPARE AND EXCHANGE OPERATION USING SLEEP-WAKEUP MECHANISM

(71) Applicant: Intel Corporation, Santa Clara, CA (US)

(72) Inventors: Bratin Saha, Santa Clara, CA (US); Matthew C. Merten, Hillsboro, OR (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 13/843,305

(22) Filed: Mar. 15, 2013

(65) Prior Publication Data
US 2013/0232499 A1    Sep. 5, 2013

Related U.S. Application Data

(63) Continuation of application No. 10/880,638, filed on Jun. 30, 2004, now Pat. No. 8,607,241.

(51) Int. Cl.
G06F 9/30 (2006.01)
G06F 9/38 (2006.01)
G06F 9/52 (2006.01)

(52) U.S. Cl.
CPC ........ *G06F 9/30021* (2013.01); *G06F 9/3004* (2013.01); *G06F 9/30032* (2013.01); *G06F 9/30087* (2013.01); *G06F 9/3857* (2013.01); *G06F 9/526* (2013.01); *G06F 2209/521* (2013.01)

(58) Field of Classification Search
None
See application file for complete search history.

(56) References Cited

U.S. PATENT DOCUMENTS

| 5,274,809 A | 12/1993 | Iwasaki et al. |
| 5,787,026 A | 7/1998 | Orenstein et al. |
| 5,790,851 A | 8/1998 | Frank et al. |
| 5,832,293 A | 11/1998 | Popescu et al. |
| 5,860,126 A | 1/1999 | Mittal |
| 5,889,983 A | 3/1999 | Mittal et al. |
| 6,112,222 A | 8/2000 | Govindaraju et al. |
| 6,223,335 B1 | 4/2001 | Cartwright, Jr. et al. |
| 6,237,024 B1 | 5/2001 | Wollrath et al. |

(Continued)

FOREIGN PATENT DOCUMENTS

| EP | 1 594 059 A2 | 11/2005 |
| JP | 2005-225149 | 9/1993 |

(Continued)

OTHER PUBLICATIONS

European Search Report, Application No. 05253896.4-1243; Intel Corporation, (Aug. 21, 2007), 3 pgs.

(Continued)

*Primary Examiner* — Eric C Wai
(74) *Attorney, Agent, or Firm* — Vecchia Patent Agent, LLC

(57) ABSTRACT

A method, apparatus, and system are provided for performing compare and exchange operations using a sleep-wakeup mechanism. According to one embodiment, an instruction at a processor is executed to help acquire a lock on behalf of the processor. If the lock is unavailable to be acquired by the processor, the instruction is put to sleep until an event has occurred.

15 Claims, 8 Drawing Sheets

(56) References Cited

U.S. PATENT DOCUMENTS

| | | |
|---|---|---|
| 6,473,819 B1 | 10/2002 | Jackson et al. |
| 6,502,170 B2 | 12/2002 | Zahir |
| 6,615,340 B1 | 9/2003 | Wilmot, II |
| 6,886,105 B2 | 4/2005 | Kahn et al. |
| 6,978,460 B2 | 12/2005 | Arakawa |
| 7,127,561 B2 | 10/2006 | Hill et al. |
| 7,213,093 B2 | 5/2007 | Hammarlund et al. |
| 7,328,293 B2 | 2/2008 | Hammarlund et al. |
| 7,437,581 B2 | 10/2008 | Gochowski et al. |
| 7,529,914 B2 | 5/2009 | Saha et al. |
| 7,555,630 B2 | 6/2009 | Jain et al. |
| 7,640,384 B2 | 12/2009 | Hammarlund et al. |
| 7,882,339 B2 | 2/2011 | Jacobson et al. |
| 8,010,969 B2 | 8/2011 | Hankins et al. |
| 8,737,390 B2 | 5/2014 | Ranganathan et al. |
| 8,775,708 B2 | 7/2014 | Saha et al. |
| 8,782,382 B2 | 7/2014 | Rajwar et al. |
| 8,843,728 B2 | 9/2014 | Wang et al. |
| 8,856,466 B2 | 10/2014 | Adl-Tabatabai et al. |
| 9,031,064 B2 | 5/2015 | Ranganathan et al. |
| 9,052,947 B2 | 6/2015 | Adl-Tabatabai et al. |
| 2003/0126186 A1 | 7/2003 | Rodgers et al. |
| 2004/0073905 A1 | 4/2004 | Emer et al. |
| 2004/0255296 A1 | 12/2004 | Schmidt et al. |
| 2005/0027628 A1 | 2/2005 | Lammersdorf et al. |
| 2005/0246506 A1 | 11/2005 | Ukai |

FOREIGN PATENT DOCUMENTS

| | | |
|---|---|---|
| JP | 2007-319716 | 12/1995 |
| JP | H09-097189 A | 4/1997 |
| JP | H10-083308 A | 3/1998 |
| JP | 2004-135875 A | 5/2004 |
| JP | 2005-316854 | 11/2005 |
| JP | 2006-500639 A | 1/2006 |
| WO | 03/040948 A1 | 5/2003 |
| WO | WO-03/058447 | 7/2003 |

OTHER PUBLICATIONS

"Improved Compare-And-Swap Instruction Using Change Bits for Computer Systems with Broadcast", IBM Technical Disclosure Bulletin, U.S.. IBM Corp., Mar. 1992. vol. 34., No. 10A., pp. 117-119.

Anderson, Thomas E., "The Performance of Spin Lock Alternatives for Shared-Memory Multiprocessors", *IEEE Transactions on Parallel and Distributed Systems*, vol. 1, No. 1., (Jan. 1990), pp. 6-16.

Intel, "Intel Architecture Software Developers Manual vol. 2: Instruction Set Reference" (1999) pp. 1-2 and 3-100 thru 3-103.

Koo, Changhoi , et al., "Some message changes in IEEE 802.16e Sleep mode", *Project, IEEE 802.16 Broadband Wireless Access Working Group*, (Jul. 21, 2003), pp. 1-5.

Office Action received for European Patent Application No. 05253896.4, mailed on May 2, 2008, 5 pages.

Office Action received for Taiwan Patent Application No. 094119878, mailed on Sep. 26, 2006, 2 pages of English Translation and 3 pages of Taiwan Office Action.

Office Action received for Korean Patent Application No. 10-2005-0056393, mailed on Sep. 29, 2006, 4 pages of English Translation and 3 pages of Korean Office Action.

Office Action received for Japanese Patent Application No. 2005-178287, mailed on Sep. 25, 2007, 2 pages of English Translation and 3 pages of Japanese Office Action.

Office Action received for Japanese Patent Application No. 2005-178287, mailed on Sep. 26, 2008, 2 pages of English Translation and 2 pages of Japanese Office Action.

Office Action received for Japanese Patent Application No. 2008-324669, mailed on Jul. 26, 2011, 3 pages of English Translation and 2 pages of Japanese Office Action.

Final Office Action received for U.S. Appl. No. 10/880,638, mailed on Dec. 8, 2011, 20 pages.

Final Office Action received for U.S. Appl. No. 10/880,638, mailed on Dec. 11, 2008, 10 pages.

Final Office Action received for U.S. Appl. No. 10/880,638, mailed on Nov. 24, 2009, 14 pages.

Non-Final Office Action received for U.S. Appl. No. 10/880,638, mailed on Dec. 14, 2012, 20 pages.

Non-Final Office Action received for U.S. Appl. No. 10/880,638, mailed on Jul. 17, 2008, 10 pages.

Non-Final Office Action received for U.S. Appl. No. 10/880,638, mailed on Jun. 10, 2011, 16 pages.

Non-Final Office Action received for U.S. Appl. No. 10/880,638, mailed on Jun. 4, 2009, 12 pages.

Notice of Allowance received for U.S. Appl. No. 10/880,638, mailed on Aug. 5, 2013, 12 pages.

Notice of Allowance received for Taiwan Patent Application No. 094119878, mailed on Jun. 4, 2007, 2 pages of Taiwanese Notice of Allowance.

Notice of Allowance received for Chinese Patent Application No. 200510079802.7, mailed on Mar. 21, 2008, 1 page of English Translation of Chinese Notice of Allowance only.

Notice of Allowance received for Japanese Patent Application No. 2008-324669, mailed on Jul. 10, 2012, 1 page of Japanese Notice of Allowance.

COMPARE AND EXCHANGE OPERATION USING SLEEP-WAKEUP MECHANISM

CROSS-REFERENCE TO RELATED APPLICATION

The present application is a continuation of U.S. patent application Ser. No. 10/880,638, filed on Jun. 30, 2004, entitled "COMPARE AND EXCHANGE OPERATION USING SLEEP-WAKEUP MECHANISM," which is hereby incorporated herein by reference.

BACKGROUND

Field of the Invention

Embodiments of this invention relate to processors. More particularly, one embodiment relates to performing compare and exchange operations using a sleep-wakeup mechanism.

Description of Related Art

Typically, a multithreaded processor or a multi-processor system is capable of processing multiple instruction sequences concurrently. A primary motivating factor driving execution of multiple instruction streams within a single processor is the resulting improvement in processor utilization. Multithreaded processors allow multiple instruction streams to execute concurrently in different execution resources in an attempt to better utilize those resources. Furthermore, multithreaded processors can be used for programs that encounter high latency delays or which often wait for events to occur.

Typically, computer systems have a single resource setup that is to be shared by all threads or processors. Not having adequate resources may result in significant contention between processors (or threads) because, for example, processors share bus and memory bandwidth. This contention is particularly evident when one or more processors wait for a semaphore or lock (which refers to the data structure often used to allow a single processor exclusive access to other data structures) to become available. This causes bottlenecking of resources, waste of memory bandwidth, compute bandwidth, microarchitectural resources, and power. The "busy waiting" of processors can also have an adverse effect on the performance of other processors in the system.

FIG. 1 is a block diagram illustrating an exemplary computer system 100 having processors 102-106 accessing a shared memory space 114. The semaphore (lock) 110 is a particular location in memory 108 that is assigned to contain a value associated with obtaining access 112 to the shared space 114. In order for one of the processors 102-106 to access the shared space 114, it first accesses the lock 110 and tests the state (value) of the data stored in the lock location 110 and, in the simplest format, either of two values are assigned to the lock 110. The first value indicates the availability of the shared space 114 for access and the second value indicates the current utilization of the shared space 114 and thus, it is not available for access. Also, bit states 1 and 0 can be used for the locked and unlocked states for the lock 110.

The accessing of the memory 108 by the processors 102-106 for data transfer typically involves the use of load and store operations. The load operation transfers memory content from a location accessed in the memory 108, while the store operation transfers data to a memory location accessed in the memory 108. Thus, load/store operations are used to access the memory 108 and the lock 110 for data transfer between the processors 102-106 and the memory 108. The load and store accesses are also referred to as read and write accesses, respectively. When performing a read, the cache line is present in the processor's cache in either "shared unmodified" or "exclusive" or "modified" according to a protocol, such as the Modified, Exclusive, Shared, Invalid (MESI) protocol. If the cache line is not present in one of these states (e.g., invalid) the processor 102-106 retrieves the line from the memory 108 and places it into "shared unmodified" or "exclusive" state. In order to perform a write, the processor 102-106 has the line in its cache in "exclusive" or "modified" state, or it retrieves it and places it into its cache in "exclusive" state. The "shared state" is available for concurrent reading, but only one processor 102-106 can have the line in "exclusive" state for reading or writing.

An example of a technique for examining the availability of and making the semaphore busy is the use of an atomic read-modify-write sequence (e.g., "test & set" (TS) mechanism). One mechanism for implementing synchronization is the "compare and exchange instruction," which is relatively efficient, but not efficient enough as it requires exclusive ownership of the cache line of the memory location. This prevents other processors from reading the memory location concurrently.

Another example includes the "test & test & set" (TTS) mechanism. The TTS mechanism is relatively more efficient because the processor accesses a local cache copy in shared state of the variable for the first test, while the semaphore is not free. However, when one processor has acquired the lock and other processors are contending (e.g., simultaneous attempted reading to check if the semaphore is free) for the lock, the TTS mechanism fails to prevent the blocking or bottlenecking of other processors. The lock acquiring processor obtains the cache line of the lock in "exclusive" state forcing it out of all other caches. When it is done writing the lock, the other processors attempt a read, which causes the acquiring processor to write its modified lock value back to memory and forward the now shared data to the other processors in a sequence of bus transactions.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Described below is a system and method for performing compare and exchange operations using a sleep-wakeup mechanism. In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 1:
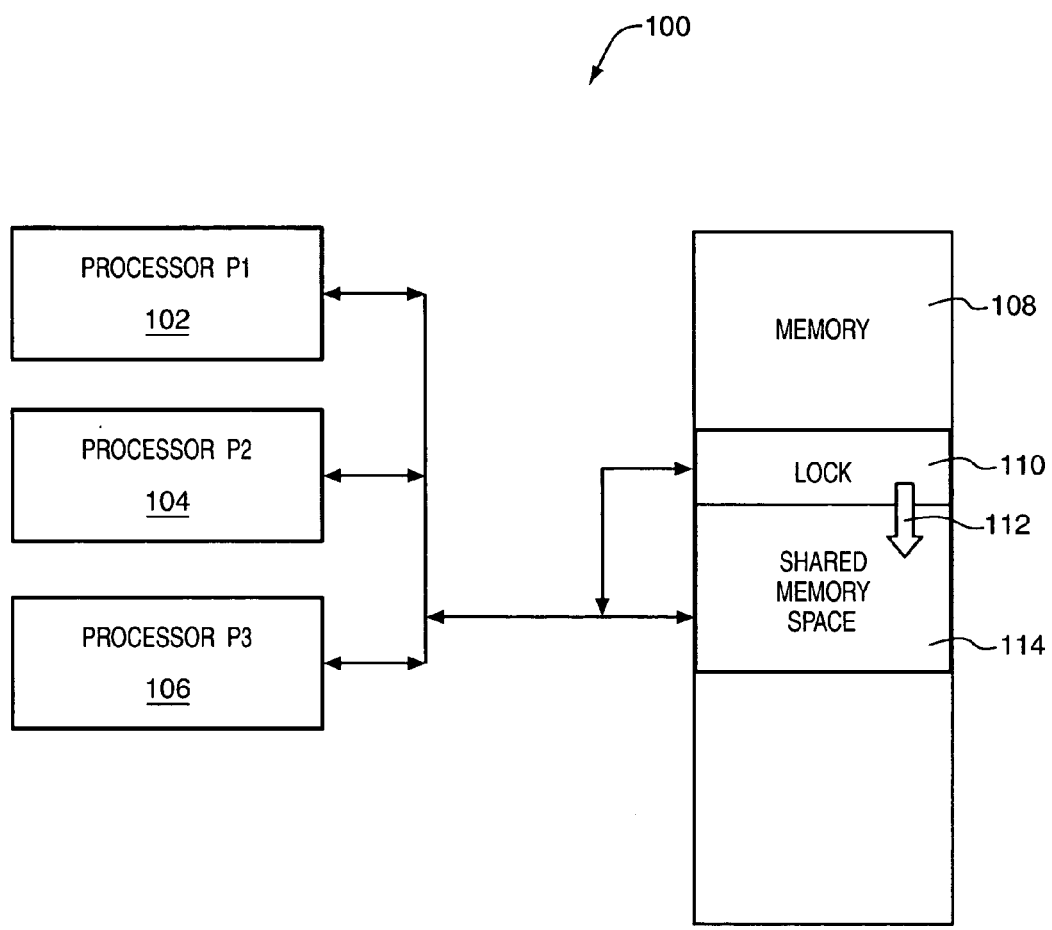
FIG. 1 is a block diagram illustrating an exemplary computer system having processors accessing a shared memory space.
Figure 2:
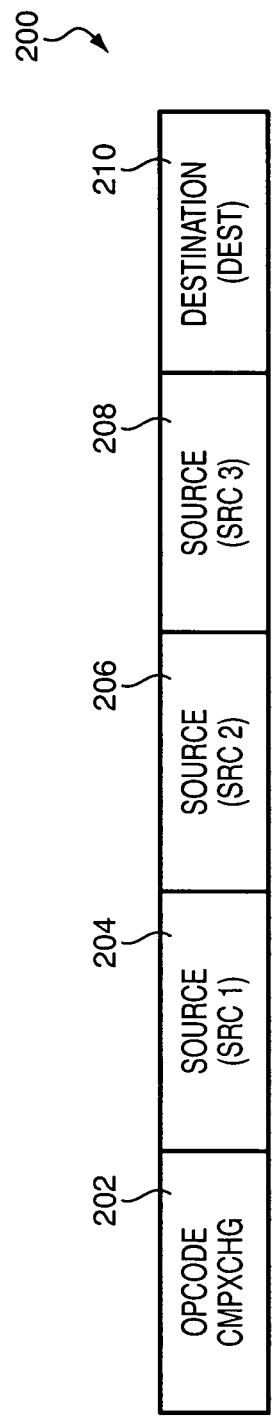
FIG. 2 is a block diagram illustrating an embodiment of an encoding scheme for an instruction.

FIG. 2 is a block diagram illustrating an embodiment of an encoding scheme for an instruction 200. An instruction (e.g., compare and exchange (CMPXCHG)) 200 for performing a read-modify-write operation is illustrated. The instruction 200 reads a first source data, compares it to another source data, and if the comparison meets predetermined criteria or condition (e.g., when a comparison is true), some modified value is written to a location. The location may include the original location of the first source data. If the predetermined condition is not met, the original data in the location is not amended. Another location may be updated with the status, including one of the locations other than the original data, as follows:

```
cmpxchg dest, src (with implicit accumulator register)
accumulator register RAX contains expected unlocked value
if accumulator = dest then
    zero-flag = 1
    dest = src
else
    zero_flag = 0
    accumulator = dest
endif
```

The instruction 200 includes a single atomic instruction including an opcode operand 202, which is used to identify the instruction 200 as CMPXCHG instruction, and operands associated with SRC1, SRC2, SRC3 and DEST 204-210 corresponding to source and destination.

Figure 3:
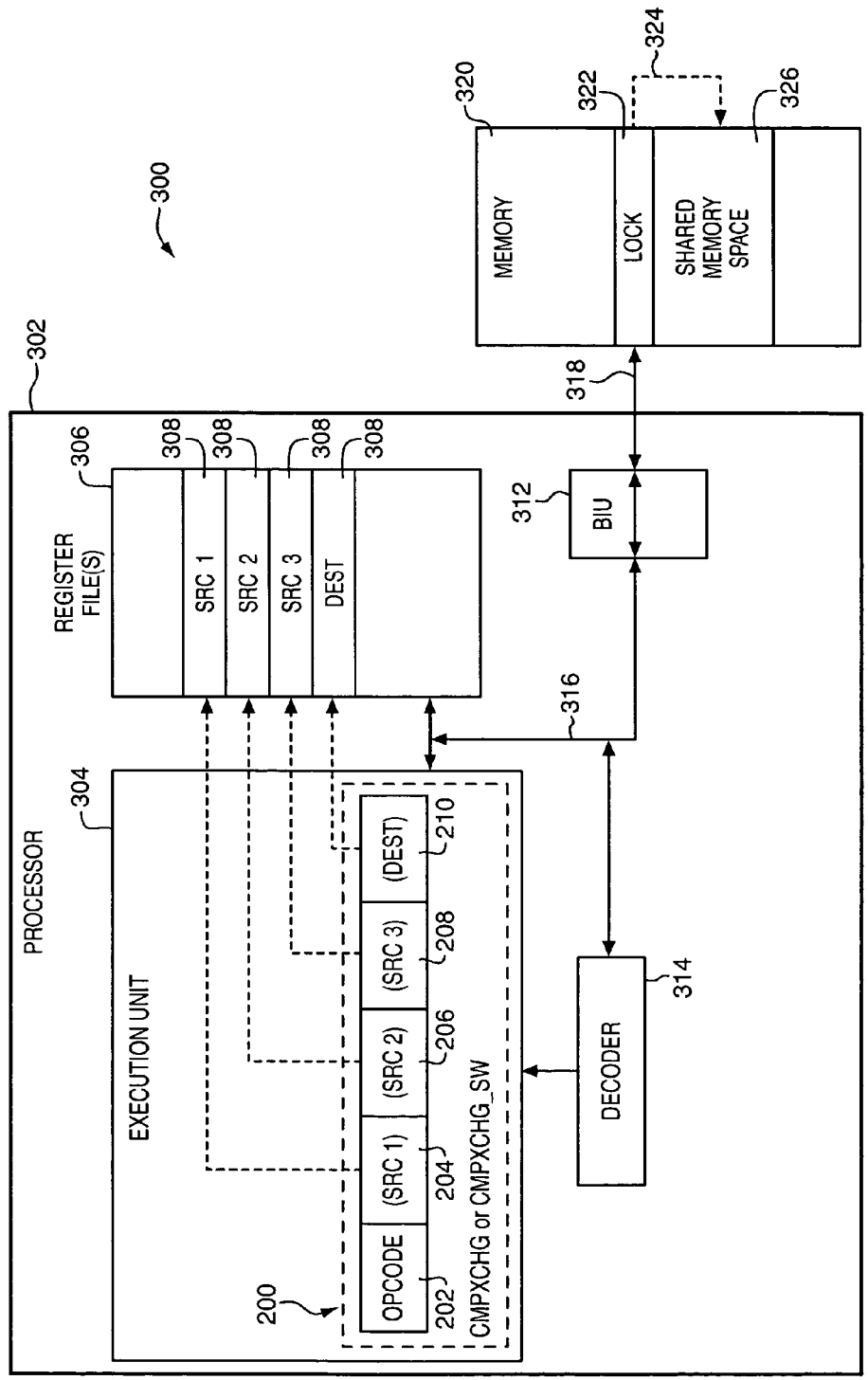
FIG. 3 is a block diagram illustrating an embodiment of a processing architecture having compare and exchange operation with sleep-wakeup mechanism.

FIG. 3 is a block diagram illustrating an embodiment of a processing architecture 300 for implementing an instruction 200. The processor 302 is shown a central processing unit (CPU) having an execution unit 304, a register file 306 (including registers 308) and a decoder 314 coupled together by a bus 316. The register file 306 includes a set of registers 308 that are accessed by the execution unit 304 for executing instructions 200. The instruction 200 may include a CMPXCHG instruction of FIG. 2 or an embodiment of a compare and exchange instruction with sleep-wakeup mechanism (CMPXCHG_SW instruction).

The instruction 200 is shown as residing within the execution unit 304 and the dotted lines are shown from the operands 202-210 of the instruction 200 to the corresponding registers 308 in the register file 306. The decoder 314 is used to decode the instruction 200 for execution. The memory 320 is in communication with the bus interface unit (BIU) 312 via a bus 318. The BIU 312 is used to transfer data between the memory 320 and the processor 302. It is contemplated that the program routine (operation sequence) for the instruction 200 may reside within the memory 320. Prior to the execution of the instruction 200, SRC1, SRC2 and SRC3 may be loaded in the registers 308. In one embodiment, a process-compare-operand (PCO) register (not shown) may be used to function as a register for SRC2 and/or DEST at different periods during the execution of the instruction 200. Stated differently, prior to the execution, SRC1 and SRC3 are loaded in the registers 308, while the SRC2 information is loaded into the PCO register, acting as the dedicated register for the SRC2 information.

In one embodiment, the instruction 200 includes a CMPXCHG_SW instruction, for which the compare and exchange operation with sleep-wakeup mechanism (CMPXCHG_SW mechanism) is implemented and performed by the processing architecture 300. Such mechanism may be implemented using hardware (e.g., implemented in the processor 302) and/or software (e.g., synchronization code to implement and perform various functions of the mechanism). In one embodiment, the CMPXCHG_SW mechanism is used to put a CMPXCHG_SW instruction to sleep if the desired lock 322 (for gaining access to the shared memory space 326) is not available, such as being acquired by another processor. Subsequently, when the acquiring processor has completed its access to the shared memory space 326, it may then need to reset (or modify) the lock 322 to the open (or unlocked) condition so that another processor can now gain control to access the shared memory space 326. How the system releases the control over the shared memory space 326 may be a design choice (e.g., as dictated by the system architecture). For example, an unlocked status value can be written directly to the lock 322 or written/saved in a register 308. The CMPXCHG_SW mechanism is further disclosed with reference to FIGS. 7-9.

Figure 4:
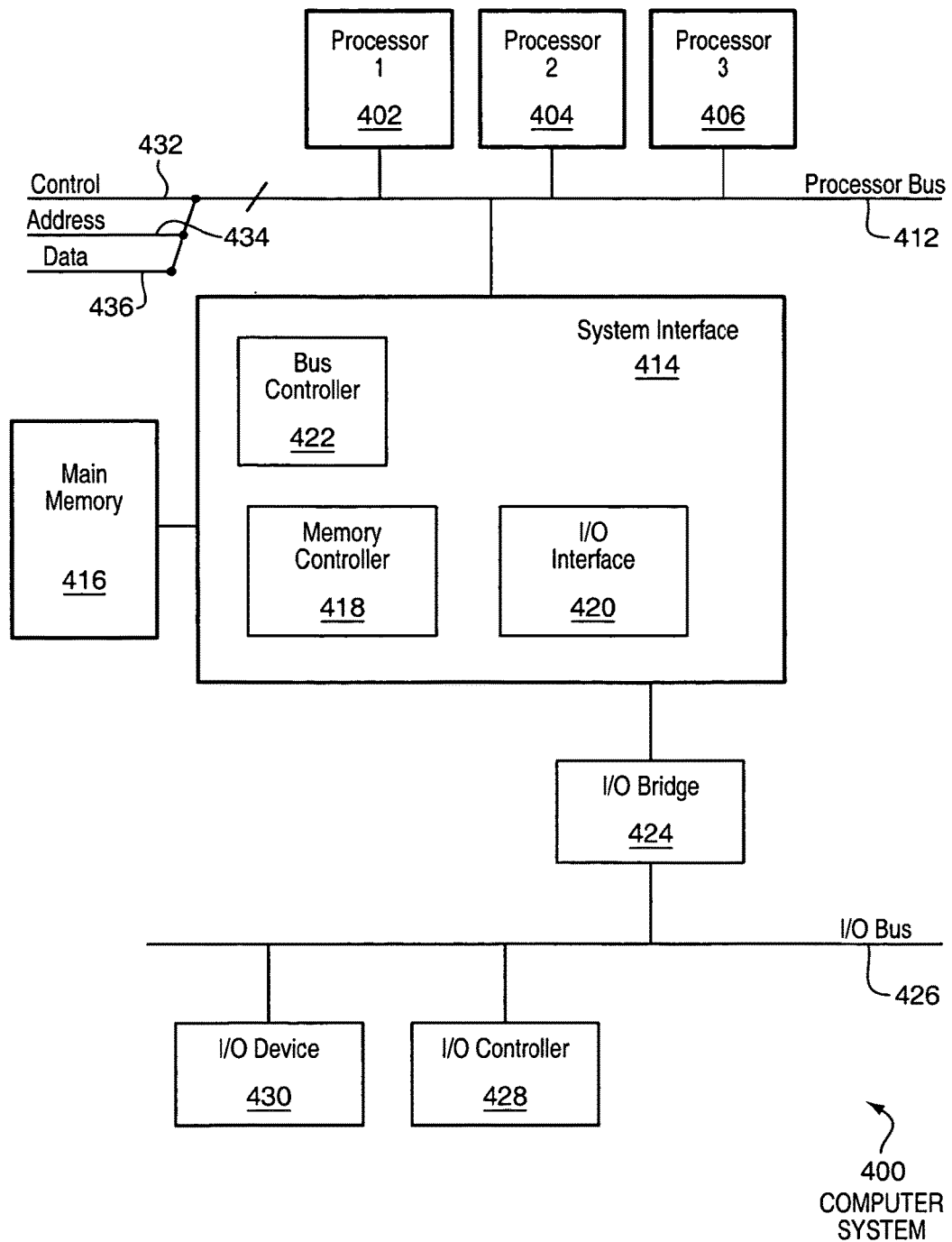
FIG. 4 is a block diagram illustrating an exemplary computer system for use in implementing one or more embodiments of the present invention.

FIG. 4 is a block diagram illustrating an exemplary computer system 400 for use in implementing one or more embodiments of the present invention. The computer system (system) includes one or more processors 402-406. The processors 402-406 may include one or more single-threaded or multi-threaded processors. A typical multi-threaded processor may include multiple threads or logical processors, and may be capable of processing multiple instruction sequences concurrently using its multiple threads. Processors 402-406 may also include one or more internal levels of cache (not shown) and a bus controller or bus interface unit to direct interaction with the processor bus 412.

Processor bus 412, also known as the host bus or the front side bus, may be used to couple the processors 402-406 with the system interface 414. Processor bus 412 may include a control bus 432, an address bus 434, and a data bus 436. The control bus 432, the address bus 434, and the data bus 436 may be multidrop bi-directional buses, e.g., connected to three or more bus agents, as opposed to a point-to-point bus, which may be connected only between two bus agents.

System interface 414 (or chipset) may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. For example, as illustrated, the I/O interface 420 may interface an I/O bridge 424 with the processor bus 412. I/O bridge 424 may operate as a bus bridge to interface between the system interface 414 and an I/O bus 426. One or more I/O controllers and/or I/O devices may be connected with the I/O bus 426, such as I/O controller 428 and I/O device 430, as illustrated. I/O bus 426 may include a peripheral component interconnect (PCI) bus or other type of I/O bus.

System 400 may include a dynamic storage device, referred to as main memory 416, or a random access memory (RAM) or other devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device (not shown) coupled to the processor bus 412 for storing static information and instructions for the processors 402-406.

Main memory 416 or dynamic storage device may include a magnetic disk or an optical disc for storing information and instructions. I/O device 430 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 400 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 400 may vary from implementation to implementation depending upon numerous factors, such as price constraints, performance requirements, technological improvements, and/or other circumstances.

It should be noted that, while the embodiments described herein may be performed under the control of a programmed processor, such as processors 402-406, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 5:
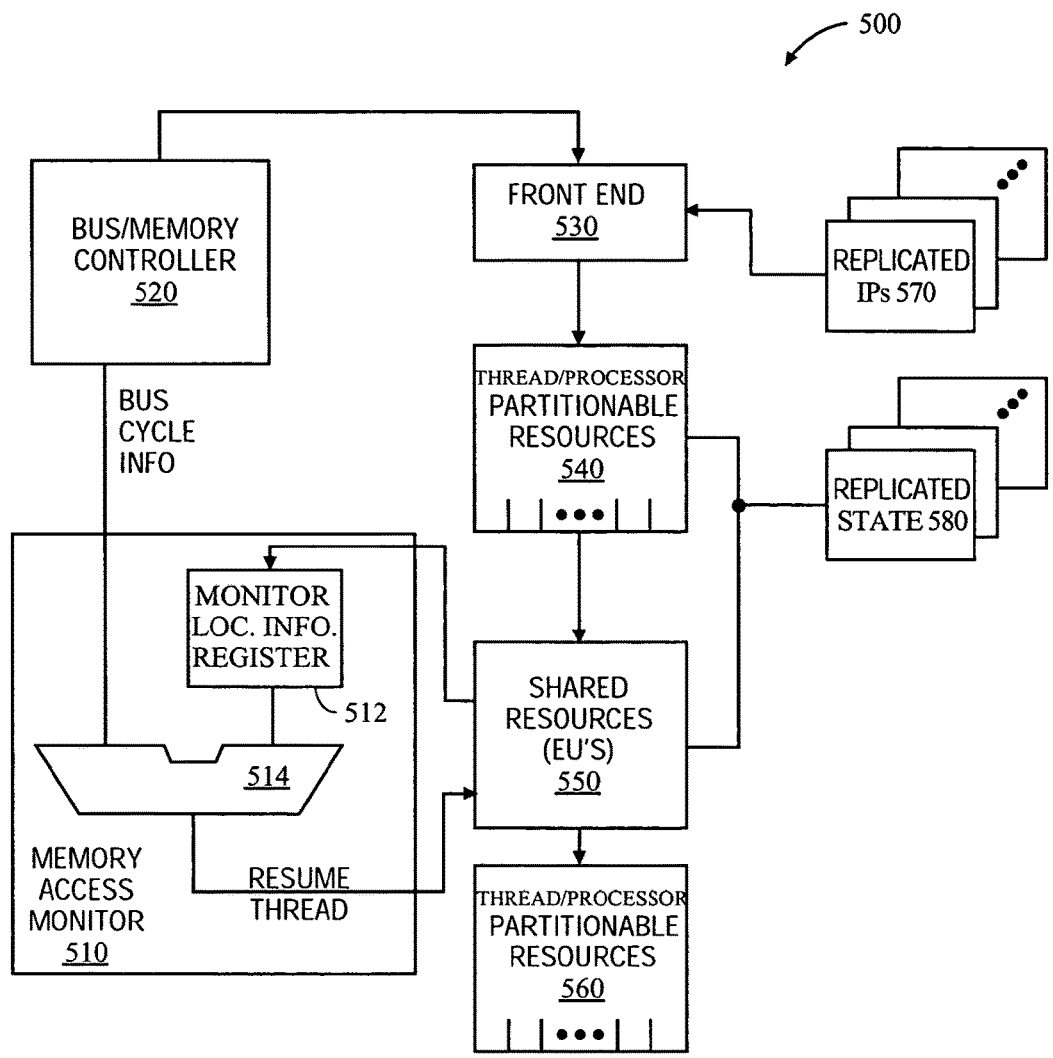
FIG. 5 is a block diagram illustrating an embodiment of a multithreaded processor for use in implementing one or more embodiments of the present invention.

FIG. 5 is a block diagram illustrating an embodiment of a multithreaded processor 500 for use in implementing one or more embodiments of the present invention. According to one embodiment a processor 500 may be formed as a single integrated circuit. According to another embodiment, multiple integrated circuits may together form a processor 500, and according to yet another embodiment, hardware and software routines (e.g., binary translation routines) may together form the processor 500. The processor 500 may include one or more of the processors 402-406 of FIG. 4. As illustrated, a bus/memory controller 520 may provide instructions for execution to a front end 530. The front end 530 may direct the retrieval of instructions from various threads according to instruction pointers 570. Instruction pointer logic may be replicated to support multiple threads.

According to one embodiment, the front end 530 may feed instructions into thread/processor partitionable resources 540 for further processing. The thread/processor partitionable resources 540 may include logically separated partitions dedicated to particular threads when multiple threads are active within the processor 500. The thread/processor partitionable resources 540 may include, for example, instruction queues. When in a single thread mode, the partitions of the thread/processor partitionable resources 540 may be combined to form a single large partition dedicated to the one thread.

According to one embodiment, the processor 500 may also include replicated state 580. The replicated state 580 may include state variables sufficient to maintain context for a logical processor. With replicated state 580, multiple threads may execute without competition for state variable storage. Additionally, register allocation logic may be replicated for each thread. The replicated state-related logic may operate with the appropriate resource partitions to prepare incoming instructions for execution.

According to one embodiment, the thread/processor partitionable resources 540 may pass instructions along to shared resources 550. The shared resources 550 may operate on instructions without regard to their origin. For example, scheduler and execution units may be thread-unaware shared resources. The partitionable resources 540 may feed instructions from multiple threads to the shared resources 550 by alternating between the threads in a fair manner that provides continued progress on each active thread.

According to one embodiment, the shared resources 550 may be followed by another set of thread/processor partitionable resources 560. The thread/processor partitionable resources 560 may include retirement resources, such as a re-order buffer. Accordingly, the thread/processor partitionable resources 560 may ensure that execution of instructions from each thread concludes properly and that the appropriate state for that thread is appropriately updated.

According to one embodiment, programmers may be provided with a mechanism to implement the functionality of efficient synchronization through sleep-wakeup compare and exchange without requiring constant polling of a memory location or even execution of instructions. For example, the memory access monitor 510 may be programmable with information about a memory access location for which the memory access monitor 510 may be enabled to watch. Accordingly, the memory access monitor 510 may include a monitor location information register 512, which is compared against memory location information received from the bus/memory controller 520 using comparison logic 514.

The monitor location information register 512 may contain details specifying the type of cycle and/or the address which may trigger the resumption or awakening of the instruction. The monitor 510 may contain a timeout counter to start the resume signal. Also, the monitor 500 may contain a register 512 that contains the address to match the information that comes across a bus. A comparison between the bus and register 512 (e.g., having the timeout counter) is conducted. Any cycle may be in the form of an explicit write cycle and/or may be a read for ownership (e.g., action that results in exclusive ownership of the cache line) or an invalidating cycle by another agent attempting to take exclusive ownership of a cacheable line.

Figure 6:
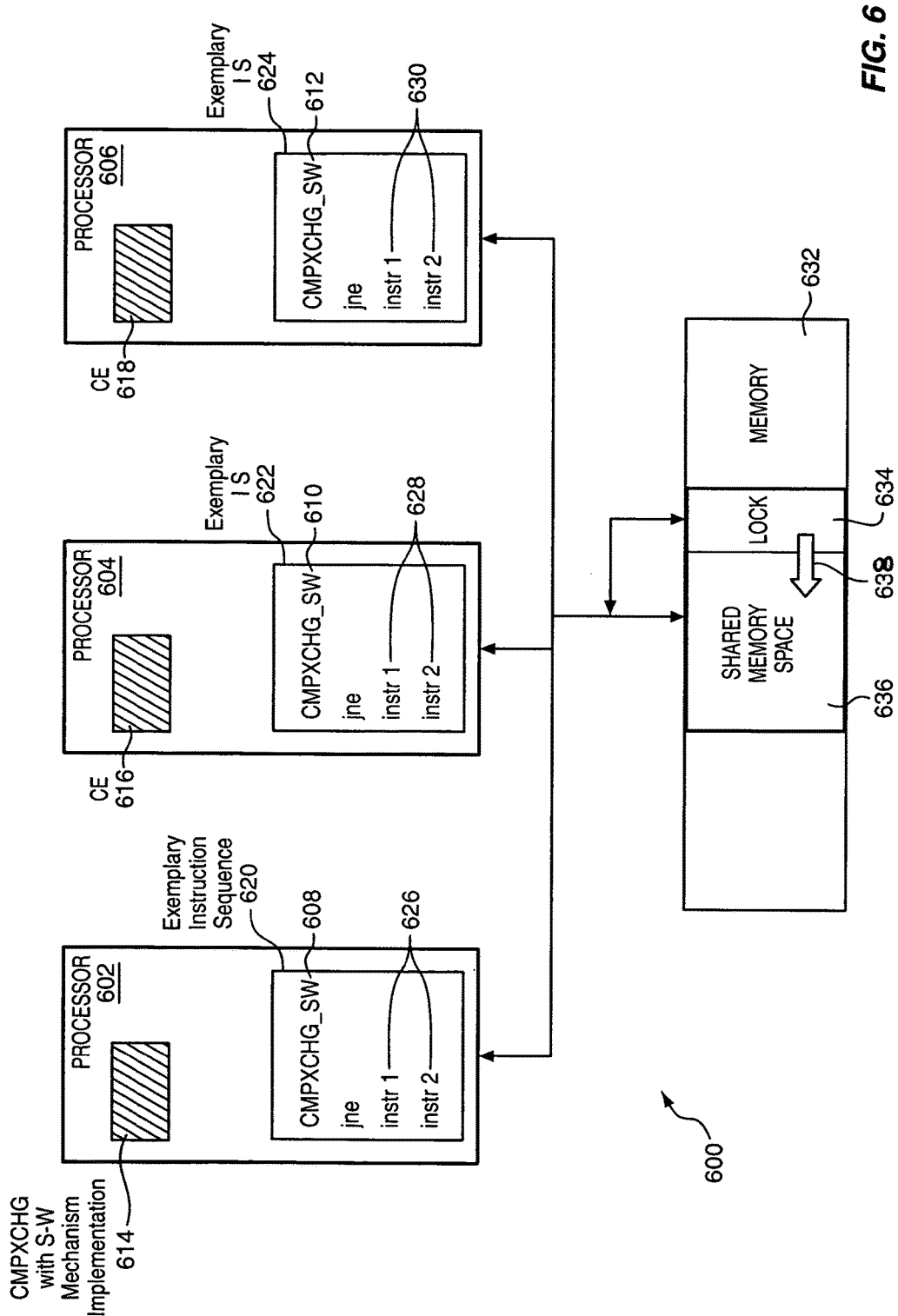
FIG. 6 is a block diagram illustrating an embodiment of a system having multiple processors using a compare and exchange operation with sleep-wakeup mechanism.

FIG. 6 is a block diagram illustrating an embodiment of a system 600 having multiple processors 602-606 using the CMPXCHG_SW mechanism 614-618. As illustrated, the system 600 includes multiple processors 602-606 contending for a lock 634, which is assigned to control accesses (as indicated by the arrow 638) to the shared space/variable 636 in the memory 632. In the illustrated embodiment, each of the processors 602-606 uses a CMPXCHG_SW mechanism 614-616, which may be hardware implemented on each processor 602-606 and is executed using a software-based synchronization code. An exemplary instruction sequence 620-624 is also shown for each processor 602-606 for clarity and better understanding of an embodiment.

As illustrated, CMPXCHG_SW instruction 608 is executed on the processor 602, which is successful in acquiring the lock 634 for access to the shared memory space 636. The shared space 636 of the memory 632 may be used for the duration of time while the processor 602 owns the semaphore, but the processor 602 may, during the acquisition process, obtain the lock 634 in the exclusive state and prevent other actions on the lock 634. Afterward, shared state may be used to share a copy of the lock 634. In one embodiment, when another processor 604-606 attempts for the lock 634 that is not free, the CMPXCHG_SW instruction 610-612 at the processor 604-606 is put to sleep. Stated differently, for example, when the processor 604 seeks to obtain the acquired lock 634, a value is returned from the memory 632 which indicates the lock 634 is being used by the processor 602 and, in one embodiment, instead of putting the processor 604 in a continuous "while" loop until the lock 634 become available, the CMPXCHG_SW instruction 610 at the processor 604 is put to sleep. Similarly, the CMPXCHG_SW instruction 612 at the processor 606 is also put to sleep when the contending lock 634 that the processor 606 is seeking is busy.

In one embodiment, putting a CMPXCHG_SW instruction 610-612 into a sleep state indicates that the CMPXCHG_SW instruction 610-612 is idle and is waiting for an event to awaken or trigger it. While the CMPXCHG_SW instructions 610-612 are in the idle or sleep state, the processors 606-608 may continue to perform other tasks, such as executing other instructions 628-630, although the instructions 628-630 may not be retired, until the older CMPXCHG_SW instructions 610-612 are awaken, have executed, and retired. Stated differently, any subsequent loads (e.g., instructions 628 or 630) can obtain its value, perform certain tasks and calculation, but wait in a tentative or speculative state in the processor 604-606, until the CMPXCHG_SW instruction 610-612 at sleep is awaken. Any instruction from the reorder buffer (ROB) can be executed, out-of-order; however, new or younger instructions 628-630 that are still in the speculative stage may not be retired, until the oldest CMPXCHG_SW instruction 610-612 is awaken and retired.

Having the processors 604-606 perform various tasks, instead of continually spin-waiting (loading and comparing) on the local shared copy, while the CMPXCHG_SW instructions 610-612 are sleeping, helps avoid the processors 604-606 from being blocked or bottlenecked. This technique helps save power and time, and improve performance. The technique further helps with concurrent progress in the absence of dynamic data sharing among the synchronizing processes. For example, suppose a hash table is protected by a lock 634 to prevent multiple processes from updating it simultaneously, and if two processes necessitated the updating of the different parts of the hash table (e.g., adding elements to different bins), the technique could allow the two processes to proceed simultaneously. This is distinguished from having one processor do the updating at the expense of completely blocking all useful work on any other processor even if it does not interfere dynamically with any other processor. For example, processor 602 may own the lock and locate the proper hash table bin and update it with its value. Meanwhile, processor 604, which does not own the lock, may also locate the proper bin, prepare the value and the location to be written, but may not retire the instructions that update the hash table until processor 604 is able acquire the lock and the retire the CMPXCHG_SW instruction 608.

In one embodiment, the waking up of the CMPXCHG_SW instruction 610-612 can be triggered with the occurring of an event, such as the lock 634 being released (and becoming available) or when an attempt is made by the processor 602 (in the exemplary instruction sequence 620) having the lock 634 to rewrite the lock value, which indicates the potential availability of the lock 634. For example, while the instruction 610 is in the sleep state, the processor 604 may monitor the availability of the lock 634 by seeking a new lock value (e.g., lock is released) or observing an attempt by a processor to change the lock value (e.g., lock is potentially released, invalidation of the cache line containing the shared space 636, invalidation of the cache line containing the lock 634). Once the attempt by a processor to change the lock value is made (e.g., the processor 602 invalidates the variable in the caches (not shown) of processors 604-606 in order to gain exclusive ownership to write to the lock variable), the waking up of the CMPX-CHG_SW instruction 610 is triggered. The processor 604 then reads the new value and, once again, requests for the lock 634 (e.g., lock variable) in the shared space 636 and, in response to the request, receives the lock variable 634 and the CMPXCHG instruction 610 is executed and retired and any other instructions 628 (executed while the CMPX-CHG_SW 610 instruction is sleeping) are also subsequently retired. By putting the instruction 610 to sleep, the processor 604 avoids continuously streaming through the typical load, compare, and branch sequence, which helps add efficiency and save power.

In one embodiment, the CMPXCHG_SW mechanism 614-618 helps avoid having a software-based spin-loop since the wait ("while" loop) may be implemented in hardware. In one embodiment, the CMPXCHG_SW mechanism 614-618 is hardware and/or software based, which integrates the "while" loop into the sleeping of the CMPX-CHG instructions 610-612, which helps avoid continuously running of the "while" loop. An exemplary synchronization code for implementing and synchronizing the mechanism 614-616 includes:

| | |
|---|---|
| eax (accumulator) = 0 | // 0 denotes free, |
| ecx = 1 | // 1 denotes locked |
| label: cmpxchg [lock_var], ecx; | // if lock_var = 0, then set to 1 zf, set lock_var = 1, // otherwise sleep |
| jne label | // if failed to acquire try again |
| instr1; | // critical section instructions |
| instr2; | // critical section instructions |
| lock_var = 0; | // unlock | where, eax and ecx (and also, ebx, edx, etc.) refer to various registers, also, generically, known as R1 or Reg1, R2 or Reg2, R3 or Reg3, etc., and zf refers to the zero flag status register of the processor, and jne (jump if not equal) refers to determining whether the attempt was successful or not, and if it was not successful, it branches back to the label (e.g., jne label) to execute an instruction.

Figure 7:
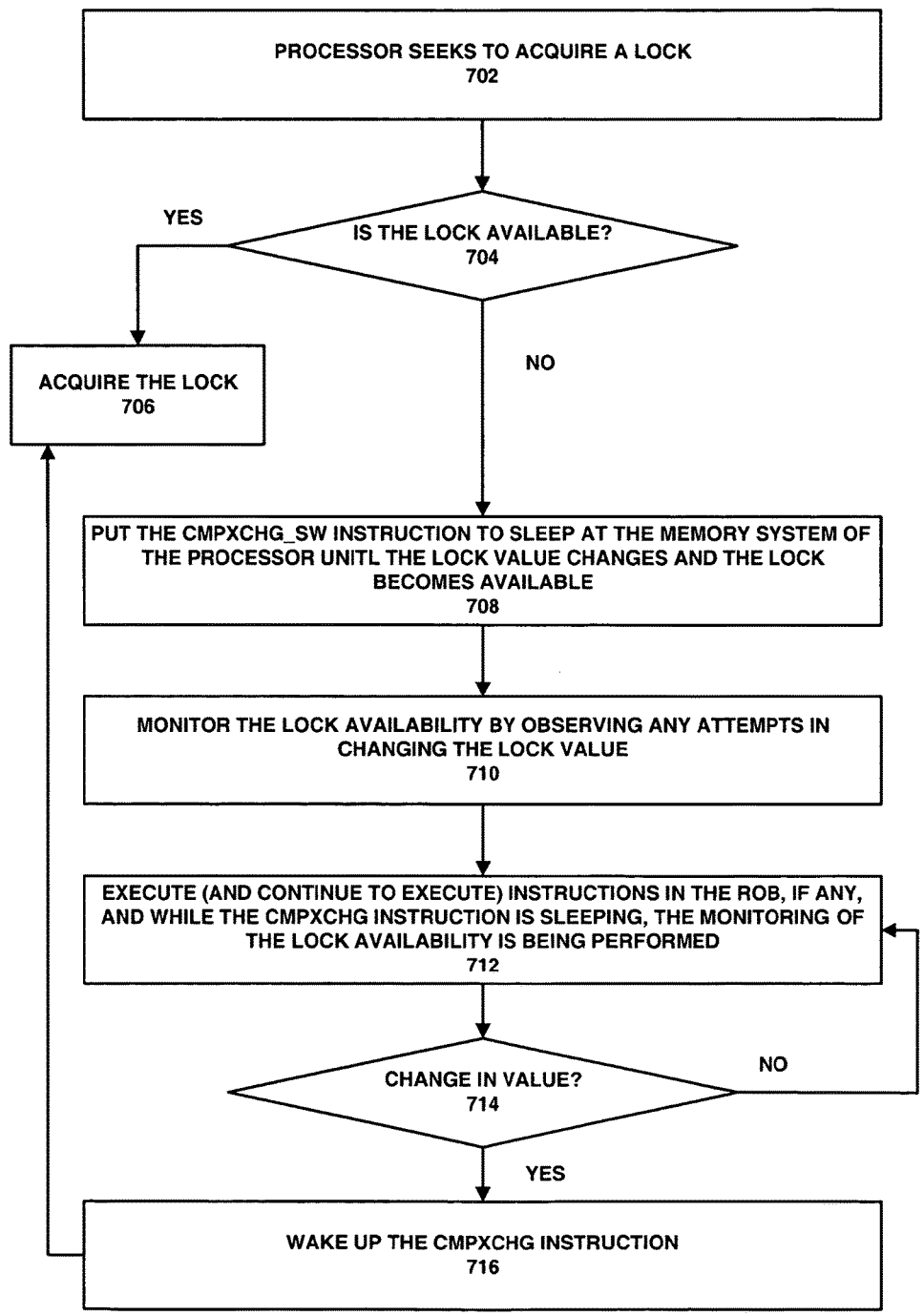
FIG. 7 is a flow diagram illustrating an embodiment of a process for performing compare and exchange operation using sleep-wakeup mechanism.

FIG. 7 is a flow diagram illustrating an embodiment of a process for performing the CMPXCHG_SW mechanism. First, at processing block 702, a processor in a multiprocessor system seeks to acquire a lock. It is contemplated that the seeking may not require an exclusive ownership of the lock, but instead, the lock may be acquired in a shared state. At decision block 704, a determination is made as to whether the lock is available. If the lock is available, the processor acquires it at processing block 706 utilizing the conventional compare and exchange operation.

In one embodiment, if the lock is not available, the CMPXCHG_SW instruction at the processor is put to sleep until, for example, it is awaken with a change (or an attempted change) in the lock value at processing block 708. Stated differently, once the value from the memory is returned to the processor indicating the unavailability of the lock, the CMPXCHG_SW instruction at the processor, which is seeking the lock, is put to sleep, instead of having the CMPXCHG_SW instruction continuously spinning in a "while" loop and re-requesting the lock with every loop. At processing block 710, the memory system of the processor monitors any changes in the lock value, which could indicate the availability or potential availability of the lock. For example, the processor having access to the lock may make an attempt to change the lock value to release the lock for other processors to seek and acquire. Any such activity may be observed by the memory system and may awaken the sleeping CMPXCHG_SW instruction to watch for possible lock availability.

In one embodiment, while the CMPXCHG_SW instruction is sleeping, the memory system of the processor monitors changes in the lock value. Furthermore, other instructions, including other CMPXCHG_SW and load instructions in the ROB, may be loaded and executed so that the processor may continue to perform other tasks at processing block 712. In other words, the sleeping of the CMPX-CHG_SW instruction at the processor not only does not put the processor in a continuous spin or a "while" loop, but also it does not render the processor blocked or useless. Instead, although out-of-order, any number of subsequent instructions may be loaded and speculatively executed inside the critical section, but the instructions younger than the sleeping CMPXCHG_SW instruction may not be retired, until the oldest instruction (e.g., the sleeping CMPXCHG_SW instruction) is retired. None of the processors are blocked and they continue to perform useful tasks, saving power and time, and improving performance.

At decision block 714, a determination is made as to whether the lock value has changed or an attempt has been made to rewrite the value. If not, the process of executing other instructions continues at processing block 712. If, however, an attempt has been made to change the lock value or if the value has been changed, the waking up of the sleeping CMPXCHG_SW instruction is triggered at processing block 716. Once the CMPXCHG_SW instruction is awaken and the lock becomes available, the lock is acquired by the processor at processing block 706. As part of the awakening of the CMPXCHG_SW instruction, the CMPX-CHG_SW instruction may then be retired. Also, any subsequent instructions in the critical section that had been speculatively executed may also be retired.

Figure 8:
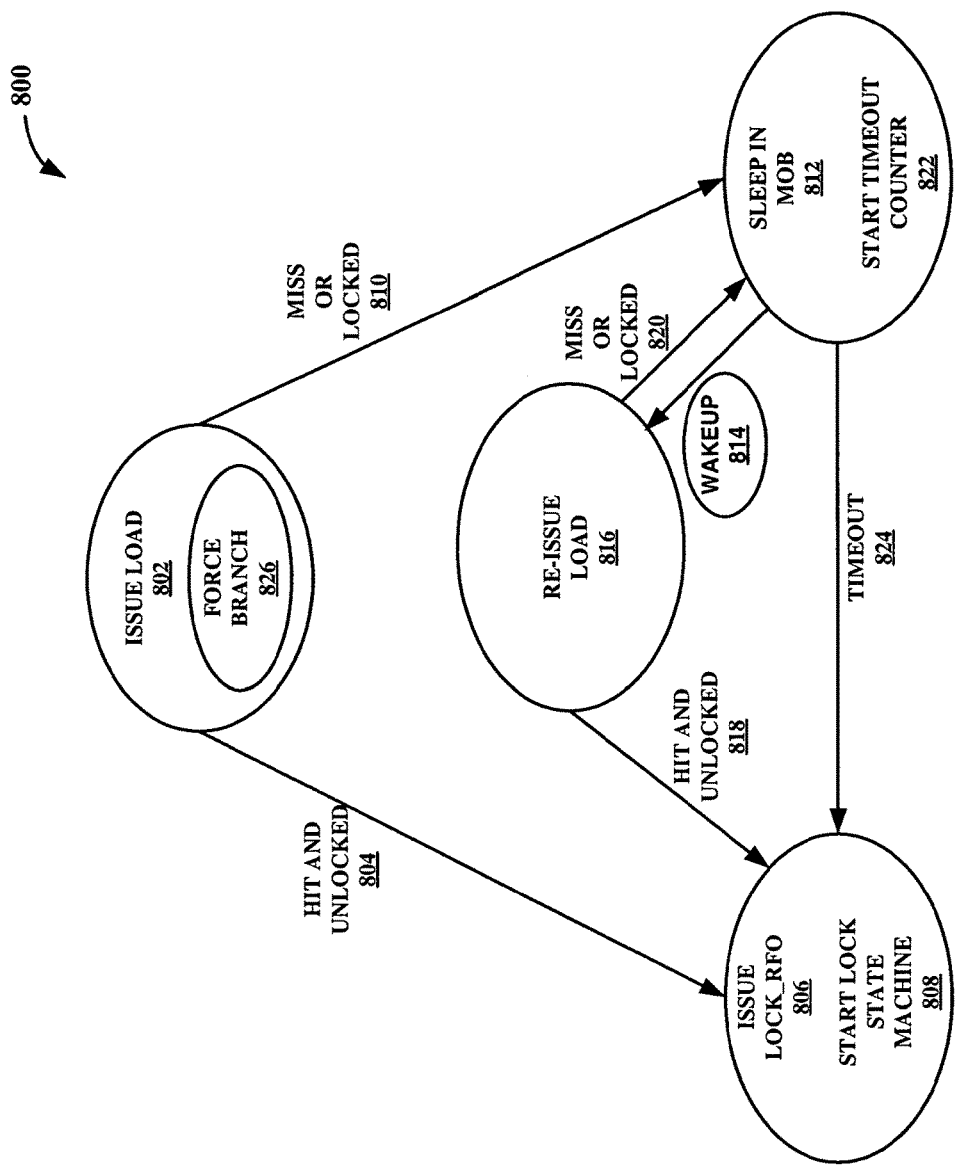
FIG. 8 is a block diagram illustrating an embodiment of a state machine for compare and exchange operation with sleep-wakeup mechanism.

FIG. 8 is a block diagram illustrating an embodiment of a state machine 800 for implementation of the CMPX-CHG_SW mechanism. If the cache line is available in the processor and the lock is available, the initial software "while" loop is passed and the instruction (e.g., CMPX-CHG_SW instruction) is executed. As illustrated, the load is issued 802. If there is a hit 804 for the cache line, and after reading the value, it is determined that the lock is available (lock is "unlocked"), a request is issued for read for ownership (RFO) 806 of the cache line. Then, the mechanism for atomically acquiring the lock is started which leads to the initiating of various microinstructions (uops), such as load.

In one embodiment, the load is issued 802, but the cache line is either missed or another processor is holding it (e.g., locked) 810 or simply there is not enough data in the cache to read or know whether it is locked or not. This may take some time to get it over the bus, which may cost several clocks to perform. This leads to the sleeping of the load in the memory order buffer (MOB) 812. The MOB 812 is used to contain the load and store buffers and to ensure that the proper ordering of memory operations is maintained. The MOB is also used to reissue loads that did not complete for some reason, such as a cache miss, memory ordering dependence, sleeping condition, etc. Further, the MOB tracks the reasons loads did not complete and wakes them up after the condition that prevented completion has been handled. In one embodiment, the data is in the cache, and after reading the value, it is determined that it is locked 810 (e.g., another processor has it). This also leads the load to go to sleep in the MOB 812. In one embodiment, one of (1) the cache line becoming available (e.g., now it is in the cache of the processor) or (2) another processor attempting to rewrite the value in the variable, potentially making the cache line available may trigger the wakeup 814 of the load. The load gets reissued 816, and if the cache line is available (e.g., there is a hit) and after reading the value it is determined that the lock is available (unlocked) 818, the request for ownership gets issued 806. However, if there is another miss 820, the load goes back to sleep 812.

In one embodiment, a timeout counter may be introduced to provide a limitation on sleep time. For example, with the start of the timeout counter 822, the sleep time is ended after a certain quantum of time has elapsed since the processor started the sleep 812. Stated differently, the processor gives up on being awakened by another processor or by an event and, instead, performs other task (e.g. going to processing step 806). For example, the timeout counter may be necessary when a lock is owned by an inactive processor, which could leave other processors waiting with little or no chance of acquiring the lock. In one embodiment, upon being awaken by the timeout counter, the instruction may attempt to acquire the lock and may retire with an unsuccessful condition. In another embodiment, upon being awaken, the instruction may abort the attempt to acquire the lock and simply retire with an unsuccessful condition. Also, the processor waiting for the lock (e.g., the processor having the CMPXCHG_SW instruction in sleep mode), times out 824, gives up on acquiring that particular lock, and performs other tasks to continue to be efficient. Also, the timeout 824 can cause the exit from the sleep state 812, indicating the processor seeking to acquire the lock for a while, but was unable to witness an invalidation of the cache line that indicates another processor is writing the line.

The CMPXCHG mechanism may be implemented in and compatible with any number of microprocessor architectures, such as Intel's Pentium processors. The changes in such architectures may be minimal to the processor's MOB and data cache unit (DCU), where the state machine 800 for implementing the "sleep" mode may be placed in the DCU. For example, 3 bits of data in the memory system may be used to indicate locked or unlocked and so, the comparison can be done against the lowest 3 bits of a register (e.g., eax). However, any number of bits (e.g., 32) can be used in the memory system to indicate the lock/unlock status and the number can be divided in any way necessitated or desired (e.g., the bits for unlock and unlock may not have to be equal). Furthermore, the CMPXCHG_SW mechanism may use values 0 and 1 for unlocked and locked values, respectively, so the 3 least significant bits may be sufficient. In one embodiment, a thread can insert an identification (ID) value, instead of 1 and 0, to indicate the status. Also, any non-zero value can indicate lock, while value 0 can indicate free. In one embodiment, if the 3 bits of the expected free value and the value of the bits that are loaded from the memory are different, then the lock may be regarded as not free; however, if the values are matched, the lock may or may not be regarded as free. For example, the comparison may indicate a partial match between the current and the unlocked value. Partial matches may start an operation in an attempt to acquire the lock (e.g., processing block 806 and 808). However, when all the bits are compared using the CMPXCHG_SW mechanism, the operation may find that the lock is acquired by another processor and may take the branch in the code and try again.

In one embodiment, for example, the comparator holds the value of eax[2:0] (e.g., the lower 3 bits of eax) and when the data is returned from a cache (e.g., L1 cache) for the load_with_store_intent uop, it is compared against the eax comparator. The load_with_store_intent uop is a constituent uop of the cmpxchg instruction and loads the value of the memory location being used as a lock variable. If the two are equal, then the value is written back on the writeback bus. If the two are not equal, the DCU aborts the writeback and puts the load to sleep in the MOB and starts the timeout counter. If the MOB detects an invalidation snoop for the lock cache line, it wakes up and re-dispatches the load_with_store_intent uop. The timeout counter may then be decremented at every clock. When it is equal to 0, the DCU may send a timeout signal to the MOB. The MOB dispatches the load_with_store_intent uop when it receives the timeout signal. During this dispatch, the load_with_store_intent uop executes to completion and retires irrespective of the result of the comparison.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. While certain exemplary embodiments have been described and shown in the accompanying drawings, it is to be understood that such embodiments are merely illustrative and not restrictive, and that the embodiments of the present invention are not to be limited to specific constructions and arrangements shown and described, since various modifications may occur to those ordinarily skilled in the art upon studying this disclosure.

What is claimed is:

1. A method in a processor, comprising:
decoding, with a decoder of the processor, a compare and exchange instruction to perform a compare and exchange operation for acquisition of a lock by the processor, the compare and exchange operation including an atomic compare and exchange operation;
executing the compare and exchange instruction with an execution unit of the processor, which includes at least some hardware, to attempt to acquire the lock; and
putting the compare and exchange instruction at the processor to sleep if the lock is unavailable as part of performing the compare and exchange instruction;
performing other instructions of a same thread as the compare and exchange instruction speculatively while the compare and exchange instruction is put to sleep; and
waking the compare and exchange instruction when an event occurs as part of performing the compare and exchange instruction.

2. The method of claim 1, further comprising monitoring a memory address corresponding to the lock, wherein the lock is to control access to a shared memory space of a memory.

3. The method of claim 1, further comprising:
monitoring a destination having a lock value to determine whether the event has occurred, the monitoring of the destination including observing one or more of the following:
(1) a change in the lock value and value; and (2) an attempt to change the lock value, wherein the destination includes a register or a memory location;

detecting the occurrence of the event;
waking up the compare and exchange instruction when the event has occurred, wherein the event comprises one or more of the following: (1) the lock becoming available if the lock value has changed; and (2) the lock potentially becoming available if the attempt to change the lock value has occurred; and
the processor acquiring the available lock.

4. The method of claim 1, wherein the putting of the compare and exchange instruction to sleep comprises relinquishing of resources for the processor to use to perform other tasks including one or more of the following:
load a plurality of instructions; and
execute the plurality of instructions.

5. The method of claim 4, wherein the relinquishing of the resources comprises:
relinquishing of a plurality of registers in a register pool;
relinquishing of a plurality of instruction queue entries in an instruction queue;
relinquishing of a plurality of store buffer entries in a store buffer; and
relinquishing of a plurality of re-order buffer entries in a re-order buffer.

6. A processor, comprising:
a plurality of registers;
a decoder to decode a compare and exchange instruction to perform a compare and exchange operation to attempt to acquire a lock, the compare and exchange operation including an atomic compare and exchange operation;
an execution unit coupled with the decoder and the plurality of registers, the execution unit including at least some hardware, the execution unit to execute the compare and exchange instruction to attempt to acquire a acquire the lock; and
a sleep-wakeup mechanism to put the compare and exchange instruction to sleep, as part of performing the compare and exchange instruction, if the attempt to acquire the lock fails; and
at least one other execution unit of the processor to perform other instructions of a same thread as the compare and exchange instruction speculatively while the compare and exchange instruction is put to sleep.

7. The processor of claim 6, further comprising:
monitor logic to monitor a destination that is to have a lock value to determine whether an event has occurred, wherein to monitor the destination is to include to observe one or more of the following: (1) a change in the lock value; and (2) an attempt to change the lock value, wherein the destination includes a dedicated register or a memory location;
detection logic to detect the occurrence of the event; and
the sleep-wakeup mechanism to wakeup the compare and exchange instruction when the event has occurred, wherein the event comprises one or more of the following: (1) the lock becoming available if the lock value has changed; and (2) the lock potentially becoming available if the attempt to change the lock value has occurred.

8. The processor of claim 6, wherein the processor when the compare and exchange instruction is put to sleep is to relinquish resources for the processor to use to perform other tasks including one or more of the following: (1) load a plurality of instructions; and (2) execute the plurality of instructions.

9. The processor of claim 8, wherein the processor is to relinquish resources comprising:
a plurality of registers in a register pool;
a plurality of instruction queue entries in an instruction queue;
a plurality of store buffer entries in a store buffer; and
a plurality of re-order buffer entries in a re-order buffer.

10. The processor of claim 6, further comprising a bus interface unit to couple the processor to a memory, the bus interface unit further includes a dedicated register associated with the compare and exchange instruction.

11. The processor of claim 6, further comprising an instruction set having a plurality of instructions including the compare and exchange instruction.

12. A processor comprising:
a plurality of registers;
a decoder to decode a compare and exchange instruction of a thread;
an execution unit coupled with the decoder and the plurality of registers, the execution unit responsive to the compare and exchange instruction being decoded to attempt to acquire a lock;
a sleep-wakeup mechanism to put the compare and exchange instruction to sleep, as part of performing the compare and exchange instruction, if the attempt to acquire the lock fails, wherein while the compare and exchange instruction is put to sleep other instructions of the thread, including instructions after the compare and exchange instruction, are to be performed out-of-order but not retired until after the compare and exchange instruction is waked up.

13. The processor of claim 12, further comprising a timeout counter to count a time while the compare and exchange instruction is put to sleep.

14. The processor of claim 12, wherein the compare and exchange instruction is to be put to sleep in a memory order buffer.

15. The processor of claim 12, wherein the sleep-wakeup mechanism is to wake the compare and exchange instruction upon detection of an invalidation snoop for a cache line associated with the lock.

* * * * *